C. MATEJOWITZ.
WEED EXTERMINATOR.
APPLICATION FILED OCT. 19, 1911.
1,047,262.
Patented Dec. 17, 1912.
3 SHEETS—SHEET 3.
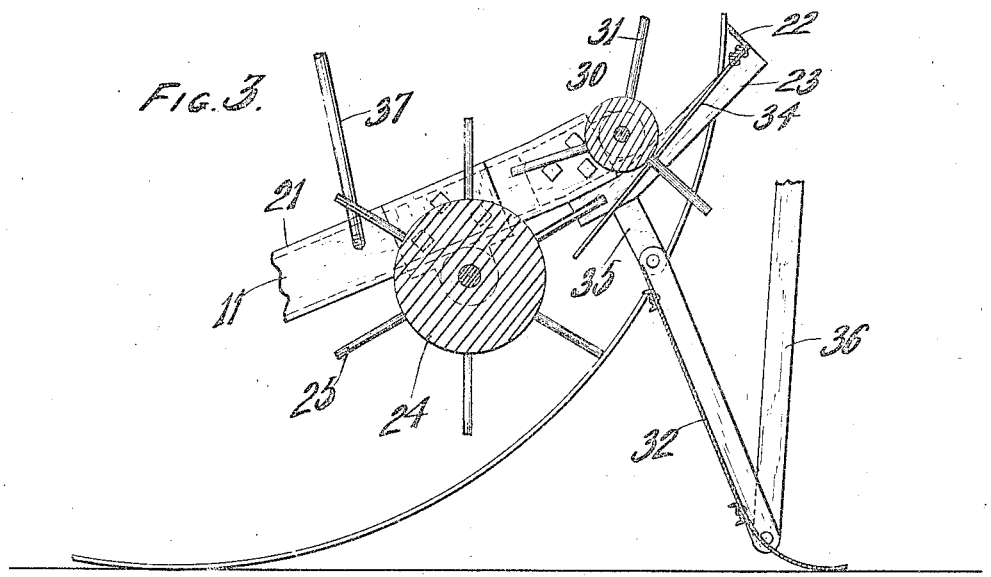
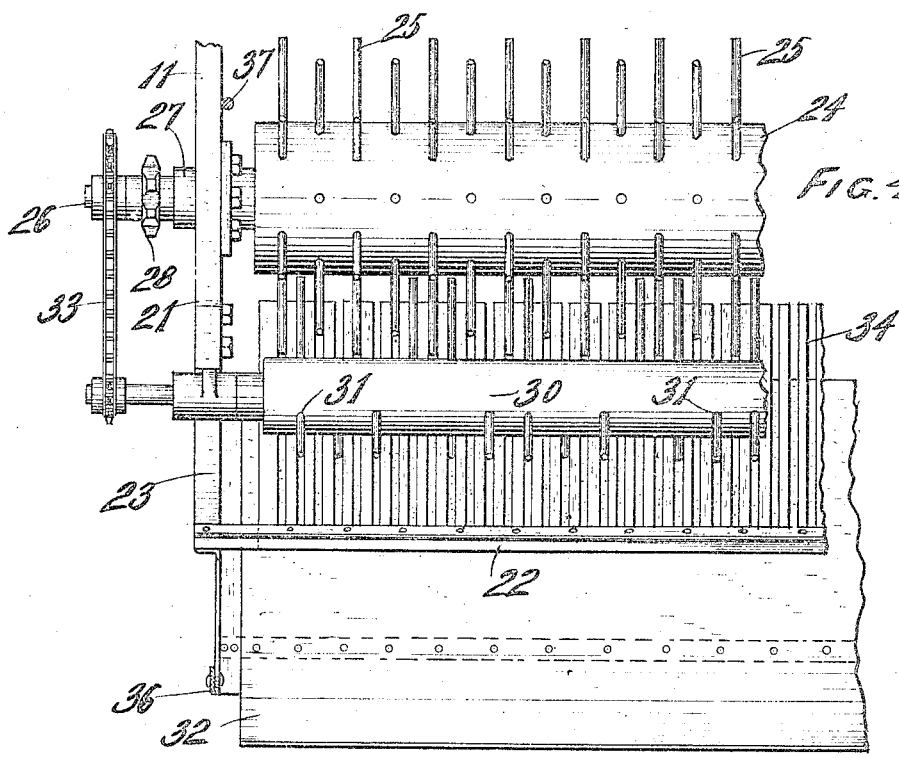

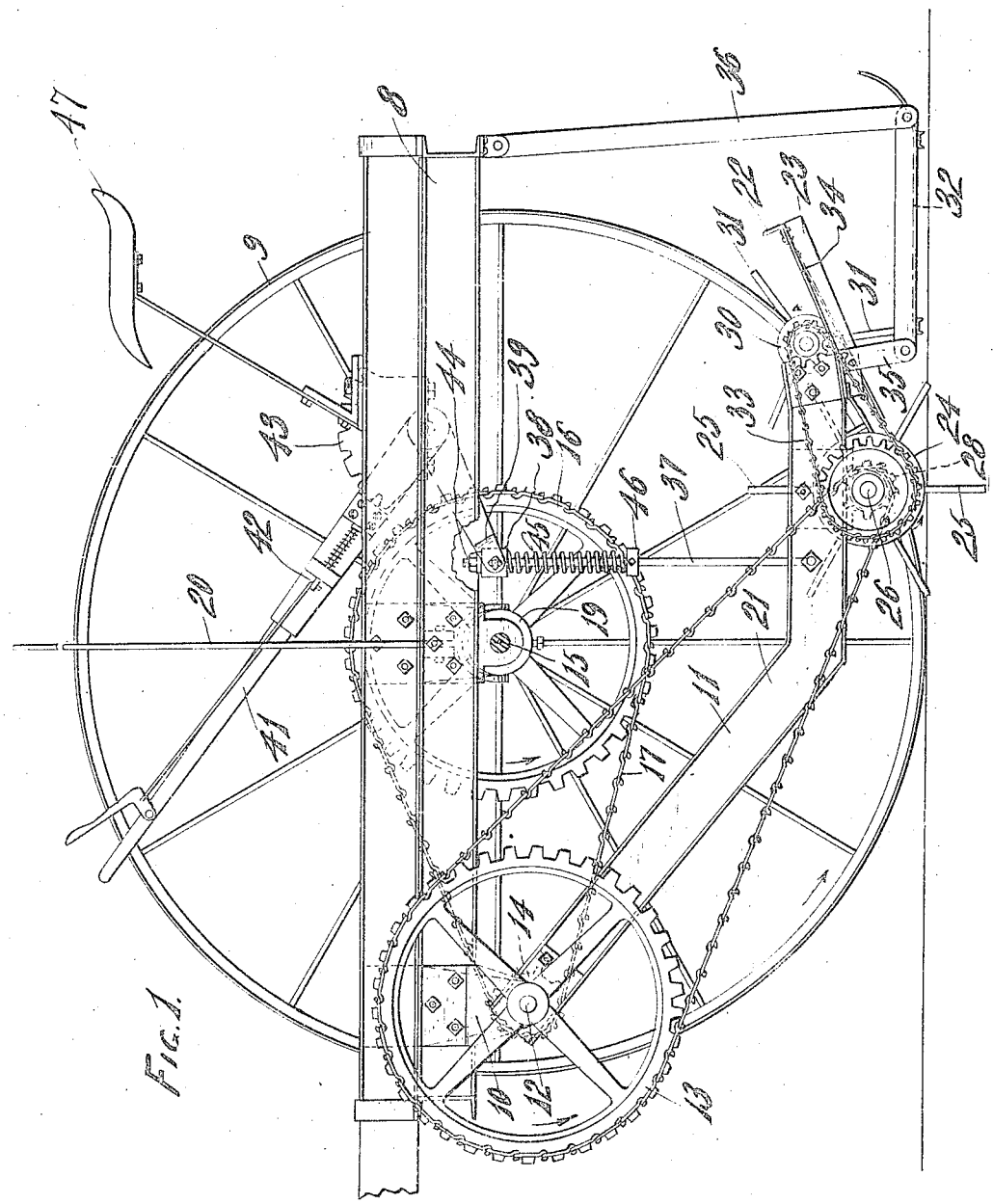

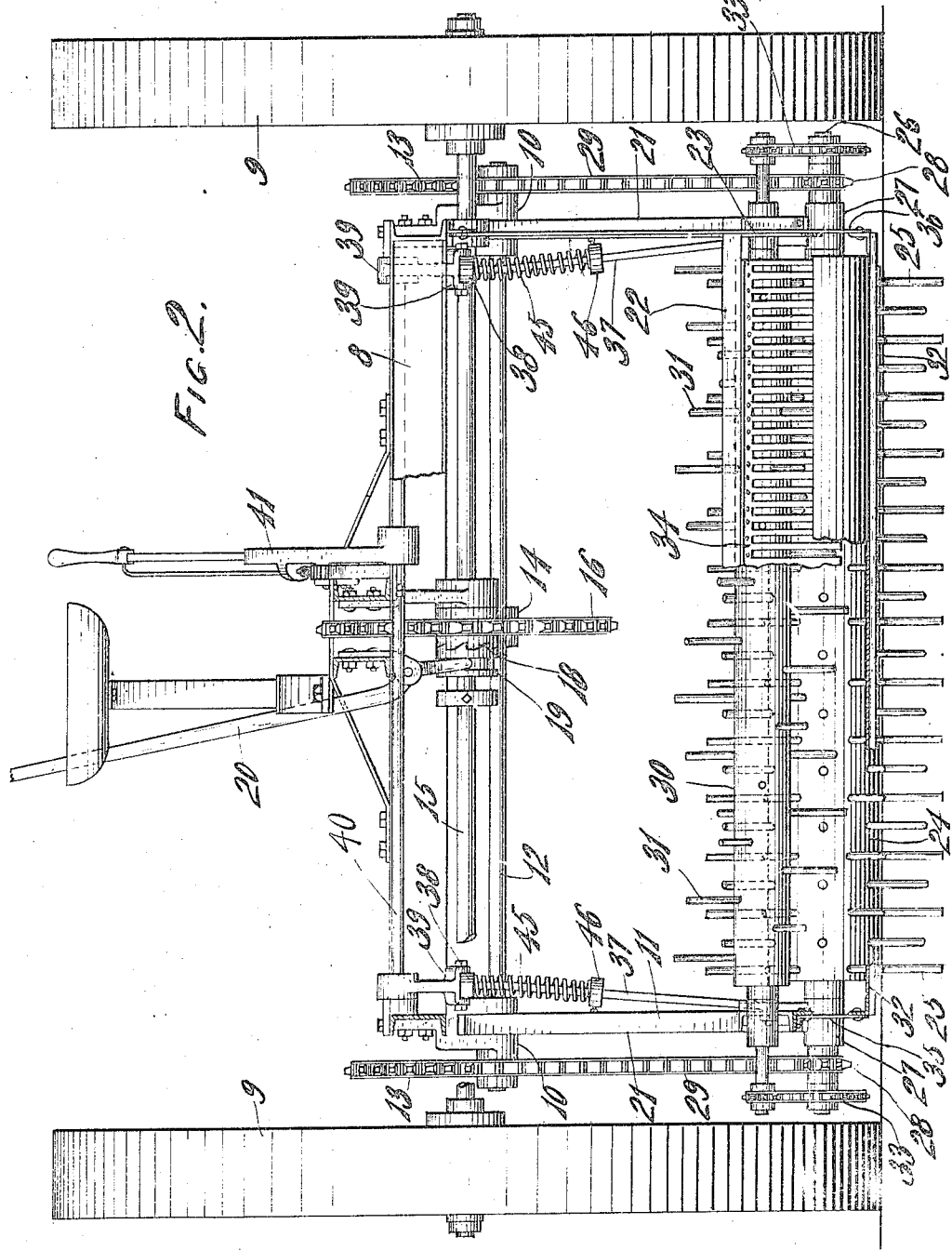

UNITED STATES PATENT OFFICE.

CHARLES MATEJOWITZ, OF KENOSHA, WISCONSIN.

WEED-EXTERMINATOR.

1,047,262.  Specification of Letters Patent.  Patented Dec. 17, 1912.

Application filed October 19, 1911. Serial No. 655,475.

*To all whom it may concern:*

Be it known that I, CHARLES MATEJOWITZ, a citizen of the United States, and resident of Kenosha, in the county of Kenosha and State of Wisconsin, have invented new and useful Improvements in Weed-Exterminators, of which the following is a description, reference being had to the accompanying drawings, which are a part of this specification.

This invention relates to improvements in weed exterminators and more particularly to that type adapted to destroy quack grass.

It is one of the objects of this invention to provide a weed exterminator which is adapted to dig into the ground and engage the roots of quack grass and pull the said grass out of the ground and deposit it upon a tiltable platform.

A further object of the invention is to provide a weed exterminator having a rotary digging means for engaging and pulling quack grass or other weeds from the ground.

A further object of the invention is to provide a weed exterminator provided with means for raising the digging portion of the machine from the ground when it is desired to pass over ground without digging the same.

A further object of the invention is to provide a weed exterminator which is simple in construction and operation, and is strong and durable, and which may be used as a general cultivator.

With the above and other objects in view the invention consists of the improved weed exterminator and its parts and combinations as set forth in the claims, and all equivalents thereof.

In the accompanying drawings in which the same reference characters indicate the same parts in all of the views: Figure 1 is a side view of the complete weed exterminator; Fig. 2 is a rear view thereof, parts broken away and other parts being shown in section; Fig. 3 is a sectional detail view of a portion of the weed exterminator on a larger scale and showing the digging portion of the exterminator in raised position; and Fig. 4 is a top view of a portion of the exterminator.

Referring to the drawings the numeral 8 indicates the frame of the machine and 9 the wheels upon which the frame is mounted. This frame is of rectangular form and is provided with depending eared brackets 10 to which an angular tiltable frame 11 is pivotally connected. A shaft 12, extending transversely across the machine and through the eared brackets and the end portions of the tiltable frame, is journaled in said brackets and is provided with sprocket wheels 13 on its outer ends. The transverse shaft 12 has also mounted medially thereon a small sprocket wheel 14 which is driven from the axle 15 by the sprocket wheel 16 and the sprocket chain 17. The sprocket wheel 16 is loosely mounted on the axle 15 and is formed with clutch teeth 18 on one side of its hub, and a complementary clutch member 19 splined to the axle is adapted to be moved into clutching engagement with the toothed hub by means of the clutch lever 20 to cause the rotation of the shaft 12. The tiltable frame 11 is formed of two side members 21 depending from the eared brackets and having their rear ends connected together by the transverse angle bar 22 which is fastened to the extension 23 of the side members 21.

A digging drum 24 provided with radially extending teeth or pins 25 extends transversely across the space between the side members 21, and the shaft 26 of said drum passes beneath said side members and is journaled in the depending boxes 27 fastened to the sides thereof. This drum is adapted to ride on the ground and engage the roots of quack grass or other weeds as the vehicle travels over the ground. The drum is positively rotated at a faster rate of speed than the travel of the machine by sprocket wheel and chain connection 28 and 29, respectively, with the sprocket wheels 13. A kicker drum 30 also provided with radially extending teeth or pins 31 is journaled on the rear ends of the side members 21 and the teeth of said drum are adapted to clear the quack grass or other weeds pulled by the drum teeth 25 and kick it upon a platform 32 supported from the frame. The kicker drum is driven by a sprocket chain and wheel connection 33 with the drum shaft 26, and is arranged to rotate at a faster rate of speed than said shaft. In order to completely clear the teeth of said drums from the material gathered a toothed plate 34 extending across the lower portion of the tiltable frame is positioned in the paths of movement of the toothed drum and the kicker drum so that when said drums are rotated their teeth will pass through the inter-tooth spaces of the plate and strip the material therefrom. The teeth of one of the drums are staggered with relation to the teeth of the other drum and the teeth of each drum pass through alternate inter-tooth spaces of the toothed plate in order to freely pass by each other. As the teeth of one drum overlap the teeth of the other drum, and both drums rotate in the same direction, the material carried on the teeth of the drum 24 will be kicked off of said teeth by the teeth of the kicker drum 30 and deposited upon the platform 32, and the teeth of the kicker drum in passing at an angle through the inter-tooth spaces of the plate, will be disengaged from the material which might be carried thereby.

The platform 32 is supported at its front end from the depending arms 35 of the tiltable frame and at its rear end is connected to the lower ends of links 36. The upper ends of these links are pivotally connected to the rear portion of the frame 8. These platform connections are all pivotally connected to the other parts to provide for tilting the platform when it is loaded with material. The rear end of the platform is curved upwardly to prevent the material from falling off when the platform is in untilted position.

The rear end portion of the tiltable frame is supported by rods 37, the upper ends of which extend through blocks 38 carried by lever arms 39. These lever arms are mounted on opposite end portions of a transverse rock shaft 40 which is journaled in the frame 8. An operating lever 41 provided with a spring actuated dog 42 is fastened medially to the rock shaft 40 and is held in adjusted position by engaging the notched segment 43. The rods 37 extend loosely through the blocks 38 and are provided with nuts 44 on their upper ends. Coiled springs 45 surrounding the rods and interposed between the blocks 38 and collars 46 are adapted to hold the tiltable frame yieldingly in its lowermost position.

A seat 47 mounted on the frame 8 is provided for the operator and the levers are positioned conveniently with relation thereto.

In operation the machine is pulled over the ground by horses in the ordinary manner, and in moving forward the chain connection between the wheels and the drums will cause the rotation of said drums, and the teeth of the lower drum to enter the ground and engage the roots of the quack grass or other like growth and pull the same upwardly and deposit the material on the platform before the teeth pass through the toothed plate. As the material is lifted out of the ground it will be engaged by the teeth of the kicker drum and kicked off of the first mentioned teeth on to the platform. The teeth of the drums in passing through the toothed plate will be cleared of any material which may cling thereto. When the platform is filled with the material the operator pulls upwardly on the operating lever and lifts the lower end of the tiltable frame upwardly, and this movement raises the forward end of the platform and tilts the material off the rear end thereof. The tiltable frame is also adapted to be raised in the same manner when it is desired to pass over ground without digging into the ground.

From the foregoing description it will be seen that the weed exterminator is of very simple construction and is well adapted to perform the function desired.

What I claim as my invention is:

1. A weed exterminator, comprising a movable frame, a digging drum mounted on the frame and having a vertical movement with relation thereto, said drum provided with projecting teeth which are adapted to enter the ground and engage and pull up weeds therefrom, a kicker drum positioned adjacent to the digging drum and provided with a plurality of projecting teeth which overlap the teeth of the digging drum and remove material therefrom, a platform positioned to receive the material from the drum teeth, means for tilting the platform to discharge the material therefrom, and means for rotating the drums.

2. A weed exterminator, comprising a main frame mounted upon wheels, a tiltable frame pivotally connected thereto, a digging drum carried by said tiltable frame and provided with projecting teeth which are adapted to dig into the ground and engage and pull up weeds therefrom, a kicker drum also carried by the tiltable frame and provided with projecting teeth which overlap the teeth of the digging drum and are adapted to remove material therefrom, a tiltable platform positioned to receive material from the drums, and means for rotating the drums.

3. A weed exterminator, comprising a main frame mounted upon wheels, a tiltable frame pivotally connected thereto, a digging drum carried by said tiltable frame and provided with projecting teeth which are adapted to dig into the ground and engage and pull up weeds therefrom, a kicker drum also carried by the tiltable frame and provided with projecting teeth which overlap the teeth of the digging drum and are adapted to remove material therefrom, links depending from the main frame, a platform pivoted to the lower ends of the links and to the tiltable frame, means for swinging the tiltable frame upwardly to tilt the platform, and means for rotating the drums.

4. A weed exterminator, comprising a main frame mounted upon wheels, a tiltable frame pivotally connected thereto, a digging drum journaled on the lower end portion of the tiltable frame and provided with projecting teeth which are adapted to dig into the ground and engage and pull up weeds therefrom, a kicker drum also journaled on the lower end portion of the tiltable frame and provided with projecting teeth which overlap the teeth of the digging drum and are staggered with relation thereto, a toothed plate carried by the tiltable frame and between the teeth of which the drum teeth pass, a lever arm mounted on the main frame and having a connection with the free end of the tiltable frame for raising and lowering said frame, said connection permitting the free movement of the tiltable frame upwardly, a sprocket wheel and chain connection between the main frame wheels and the digging drum, a sprocket wheel and chain connection between the digging drum and the kicker drum, links depending from the main frame, and a platform connected to the lower ends of the links and to the tiltable frame.

5. A weed exterminator, comprising a main frame mounted upon wheels, a tiltable frame pivotally connected thereto, a digging drum journaled on the lower portion of the tiltable frame and provided with projecting teeth which are adapted to dig into the ground and engage and pull up weeds therefrom, a kicker drum also journaled on the lower end portion of the tiltable frame and provided with projecting teeth which overlap the teeth of the digging drum and are staggered with relation thereto, a toothed plate carried by the tiltable frame and between the teeth of which the drum teeth pass, a lever arm mounted on the main frame and having a connection with the free end of the tiltable frame for raising and lowering said frame, said connection permitting the free movement of the tiltable frame upwardly, a sprocket wheel mounted on the main frame and in axial alinement with the pivotal connection of the tiltable frame with the main frame, a sprocket wheel and chain connection with the main frame wheels and the sprocket wheel, a sprocket wheel connected to the digging drum and having a sprocket chain connection with the first mentioned sprocket, a sprocket wheel and chain connection between the two drums, links depending from the main frame, and a platform connected to the lower ends of the links and to the tiltable frame.

In testimony whereof, I affix my signature, in presence of two witnesses.

CHARLES X MATEJOWITZ
his mark

Witnesses:
JAMES G. HALLAS,
DWIGHT KOUBA.